(12) United States Patent
Berard et al.

(10) Patent No.: US 6,526,704 B1
(45) Date of Patent: Mar. 4, 2003

(54) PADDED RAISED FLOORING PANELS AND COVERINGS

(75) Inventors: Raymond A Berard, Kennesaw, GA (US); Ray C. Anderson, Atlanta, GA (US); Graham A. Scott, LaGrange, GA (US); David Whitley, LaGrange, GA (US)

(73) Assignee: Interface, Inc., Atlanta, GA (US)

( * ) Notice: Subject to any disclaimer, the term of this patent is extended or adjusted under 35 U.S.C. 154(b) by 0 days.

(21) Appl. No.: 09/720,323

(22) PCT Filed: Jul. 29, 1999

(86) PCT No.: PCT/US99/17327

§ 371 (c)(1),
(2), (4) Date: Dec. 22, 2000

(87) PCT Pub. No.: WO00/06853

PCT Pub. Date: Feb. 10, 2000

Related U.S. Application Data

(63) Continuation of application No. 09/124,095, filed on Jul. 29, 1998, now abandoned
(60) Provisional application No. 60/123,883, filed on Mar. 11, 1999.

(51) Int. Cl.[7] .......................... E04F 15/024; E04C 2/02
(52) U.S. Cl. ................... 52/177; 52/506.06; 52/796.1; 428/100
(58) Field of Search ..................... 52/177, 263, 796.1, 52/506.06, 508; 428/85, 86, 90, 91, 95, 96, 97, 100

(56) References Cited

U.S. PATENT DOCUMENTS

| 406,866 | A | 7/1889 | Atwater |
| 1,685,362 | A | 9/1928 | Joseph |
| 1,711,149 | A | 4/1929 | Joseph |
| 2,250,669 | A | 7/1941 | Jamgotchian |
| 2,367,536 | A | 1/1945 | Spitzli |
| 2,702,919 | A | 3/1955 | Judge |
| 2,726,419 | A | 12/1955 | Saks et al. |
| 3,271,217 | A | 9/1966 | Mapson |
| 3,494,006 | A | 2/1970 | Brumlik |
| 3,538,536 | A | 11/1970 | Pecorella |
| 3,558,384 | A | 1/1971 | Ronning |
| 3,558,385 | A | 1/1971 | Ronning |
| 3,558,386 | A | 1/1971 | Ronning |
| 3,712,845 | A | 1/1973 | Hartung |
| 3,788,941 | A | 1/1974 | Kupits |
| 3,858,269 | A | 1/1975 | Sutton et al. |
| 4,012,544 | A | 3/1977 | Richards |
| 4,447,998 | A | * | 5/1984 | Griffin .......................... 52/263 |

(List continued on next page.)

FOREIGN PATENT DOCUMENTS

| AU | 360217 | 12/1980 |
| FR | 1239859 | 7/1960 |
| GB | 1350767 | 4/1974 |
| GB | 2113993 | 8/1983 |
| WO | WO 93/10319 | 5/1993 |
| WO | WO 98/10688 | 3/1998 |
| WO | WO 98/24990 | 6/1998 |

Primary Examiner—Michael Safavi
(74) Attorney, Agent, or Firm—Kilpatrick, Stockton LLP; John S. Pratt; Kristin Johnson

(57) ABSTRACT

Raised access flooring utilizing panels having a thick, resilient pad bonded directly to and covering the entire surface of the panel. The pad acts like the backing layer of a conventional floor treatment by absorbing impact and attenuation sound. A reinforced face cloth module having only a face layer and a stabilizing layer covers the pad to protect the pad from wear and to provide an attractive floor treatment. The reinforced face cloth module can be detachable or bonded directly to the pad. Alternatively, hook and loop fasteners can removably affix the pad to the face cloth module.

1 Claim, 2 Drawing Sheets

U.S. PATENT DOCUMENTS

| | | |
|---|---|---|
| 4,489,115 A | 12/1984 | Layman et al. |
| 4,522,857 A * | 6/1985 | Higgins .................. 428/95 |
| 4,561,232 A | 12/1985 | Gladden, Jr. et al. |
| 4,769,895 A | 9/1988 | Parkins |
| 4,824,498 A | 4/1989 | Goodwin et al. |
| 4,996,818 A * | 3/1991 | Bettinger ................ 52/796.1 |
| 5,034,258 A | 7/1991 | Grace |
| 5,096,764 A * | 3/1992 | Terry et al. ............... 428/95 |
| 5,116,439 A | 5/1992 | Raus |
| 5,304,410 A | 4/1994 | Webster |
| 5,370,757 A | 12/1994 | Corbin et al. |
| 5,389,737 A | 2/1995 | Kobayashi et al. |
| 5,422,156 A | 6/1995 | Billarant |
| 5,540,968 A | 7/1996 | Higgins |
| 5,560,972 A * | 10/1996 | Blakely et al. ............ 428/95 |

* cited by examiner

PADDED RAISED FLOORING PANELS AND COVERINGS

RELATED APPLICATIONS

This application claims priority to and is a continuation of U.S. patent application Ser. No. 09/124,095 filed Jul. 29, 1998, now abandoned entitled, "Padded Raised Flooring Panels and Coverings," and U.S. Patent Application No. 60/123,883 filed Mar. 11, 1999, entitled, "Raised Floor Tape Locator System for Carpet Tile," both which are incorporated by reference herein.

FIELD OF THE INVENTION

This invention relates to raised panel or access flooring systems and floor coverings, including carpet and carpet tile and resilient sheet and tile products.

BACKGROUND OF THE INVENTION

Myriad materials have been used for flooring and floor coverings in buildings, including virtually every natural and human-made material imaginable, such as wood, stone, concrete, cork, plastics, paint, carpets, rugs, vinyl sheets and tiles, sawdust, rushes, and animal skins, to name just a few. Rugs and carpets in a wide variety of materials, patterns and constructions have been manufactured for centuries, particularly for use in homes. As recently as the middle of the twentieth century, carpets and rugs were virtually never used in commercial and industrial buildings like manufacturing facilities, stores and offices. Floors in such locations utilized "hard surface" materials like concrete, concrete compositions, wood or sheet materials like linoleum. Beginning in approximately the late 1960's and 1970's, carpet and carpet tiles began to be used extensively in commercial and "light" industrial buildings, a trend that was accelerated by the advent of new carpet technologies that provided more durable and attractive products and by the popularity of "open" floor plan offices.

As a result of these developments, the comfort and aesthetic appeal of carpet and carpet tile have come to be widely expected in offices and other commercial environments.

Floor structures in most office and commercial buildings are concrete. Typically, a modest amount of cabling in conduits and the like are buried in the concrete. Drop ceilings are frequently used in office and other commercial buildings to conceal the many other infrastructure elements normally found in buildings, such as electricity and communications cabling; water and sewage pipes; and heating, ventilation and air conditioning (HVAC) ducts. However, difficulty in accessing these elements and the cabling needs of some computer installations have led to the increased use of raised panel flooring. Raised panel flooring, also known as access flooring, typically includes multiple rigid floor panels which are supported by a pedestal and stringer structure that rests on the concrete slab floor of the building. An example is shown in U.S. Design Pat. No. D370,060, entitled "Modular Grid Understructure," dated May 21, 1996, which is incorporated herein by this reference. The panels provide a stable floor, while the support structure creates a space or "subfloor" under the panels and above the concrete slab floor for routing infrastructure elements.

Rigid flooring panels are typically constructed of aluminum, steel, wood, concrete or various combinations thereof. For example, flooring panels may be made of concrete or wood encased in a steel shell. These unyielding surfaces are uncomfortable and noisy to walk on. Also, bare metal surfaces (or even painted or coated surfaces) may be unattractive, creating an unpleasant environment, particularly in light of the expectations mentioned above that have developed as a result of widespread use of carpet in office and commercial environments. Thus, access floors often are covered with a sound and shock absorbent material, such as carpet tile. The use of carpet tiles also improves the aesthetic appearance of the floor.

Carpet tiles can have a wide variety of constructions. However, carpet tiles typically include at least two layers: a top or "face" layer and a bottom or "backing" layer. The face layer is a relatively thin textile fiber layer, typically tufted, fusion bonded, woven or needle punched. The backing layer is a relatively thick resilient pad that contributes many desirable properties to the overall tile, such as cushioning and sound attenuation. The backing layer is hidden from view under the face layer.

Accessing the subfloor requires removal and reinstallation of the rigid panels and any carpet tiles or other floor covering lying on the panels. Frequent movement of the tiles, traffic on the floor and other contacts with the tiles often damage the tiles, requiring replacement. The damage to the tiles is typically restricted to the face layer of the tile; the backing layer is rarely damaged. Moreover, purely cosmetic damage to the backing layer can be ignored since the backing is not visible. In contrast, even minor damage to the facing layer may necessitate replacement of the entire tile. Thus, as a result of minor damage to only one portion of the tile, the entire tile must be discarded. The disposal and/or recycling of both the face and backing layers is particularly difficult, because, due to the dissimilarities in materials, the various carpet components must be separated prior to recycling. As a result, damaged carpet tiles are often discarded, creating disposal costs and environmental problems. Alternatively, recyclers are forced to used complex and expensive recycling systems that can separate the dissimilar materials. It would be desirable to provide systems for use with access flooring which minimizes the disposal, recycling and/or replacement cost of damaged tiles while providing the aesthetic and functional characteristics of carpet tile or other conventional floor treatments.

One approach in the art was a steel panel with welded side flanges and a tile having a carpet square bonded thereto and a base plate having flanges with an inward projection that snaps onto the steel panel as disclosed by U.S. Pat. No. 4,996,818 issued to Bettiuger, Mar. 5, 1991. In Bettinger, the entire tile including the bonded carpet and the base plate are removed. Bettinger does not provide for detaching only the carpet portion of the tile. Attempts to remove the bonded carpet from the tile are likely to destroy the carpet leaving it unusable. Thus, with Bettinger, the entire tile must be removed and not just the bonded carpet. Thus, a need still exists for a system and method that provides for detaching the upper carpet portion of a floor covering of a raised access floor panel system where the carpet is not destroyed and may be reused.

SUMMARY OF THE INVENTION

This invention addresses these limitation by presenting a relatively thick, resilient pad is bonded directly to and covers the entire surface of an access floor panel. The pad provides the functional characteristics of conventional floor treatments by absorbing impacts, attenuating sound and contributing to the desired "feel" when standing or walking on the floor. "Installation" of the pad occurs in the factory where it is bonded to the panel, rather than on-site, thereby simplifying on-site activities.

Modules of "reinforced face cloth" having only a face layer and a stabilizing layer are used to cover the pad. The reinforced face cloth modules provide the desired aesthetic effect of conventional floor treatments. The reinforced face cloth modules also extend the life of the pad by reducing wear.

In one embodiment, the reinforced face cloth modules are not bonded to the padded floor panels. Alternatively, the modules may be bonded lightly to the pad with a pressure sensitive adhesive that allows easy removal. The pressure sensitive adhesive prevents the module from sliding without limiting the ability to remove the module from the pad. In either case, damaged or worn modules can be replaced with a minimum of material usage and dramatically lower cost than if conventional floor treatments were replaced. Furthermore, because the pad and the modules are at most only lightly bonded together, the complexity and cost of separating the modules from the pad and recycling either or both the pad and the module is reduced.

In an alternative embodiment of this invention, the reinforced face cloth modules affix to the pad utilizing hook and loop fasteners.

The pad may be cast directly onto the panel or may be manufactured separately and bonded to the panel with an adhesive. In the event the pads are cast directly onto the panel, additional pads may be manufactured separately for use to replace damaged pads. Alternatively, damaged pads may be repaired by filing in the damaged area with an appropriate repair material, or panels having damaged pads may simply be replaced.

The reinforced face cloth modules may be manufactured in sizes corresponding to the panels or may be manufactured in any desired standard sizes and distributed on the floor independent of the panel interfaces.

Accordingly, it is an object of the present invention to provide aesthetic and wear coverings for raised flooring panels which are easily replaced with a minimum of waste.

Another object of the present invention is to provide shock absorbent and sound attenuating coverings for raised flooring panels in which the coverings are affixed to the panel.

Another object of the present invention is to provide coverings for raised flooring panels having an inexpensively replaced face cloth module.

Another object of the present invention is to provide coverings for raised floor panels which minimize waste and reduce recycling costs.

Other objects, features and advantages of the present invention will become apparent with reference to the drawings, the following description of the drawings and the claims.

DETAILED DESCRIPTION

Figure 1:
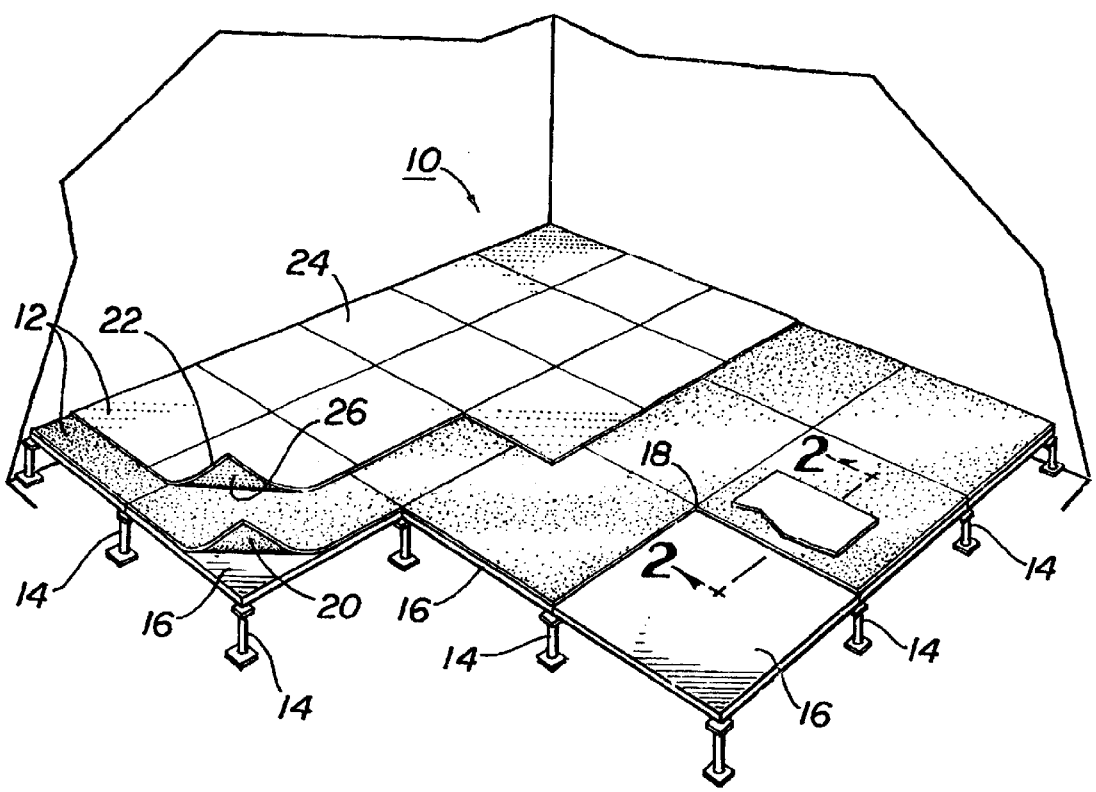
FIG. 1 is a perspective view of a room with a partially installed raised floor with corners of components of the panel covering partially lifted to show the structure of the covering.

FIG. 1 illustrates the installation of a raised floor system 10 using covering 12 in accordance with the present invention. Raised floor 10 includes support columns 14 and floor panels 16. Columns 14 are typically distributed on the floor of a room at intervals that coincide with the intersection 18 of the corners of adjacent panels 16.

Figure 2:
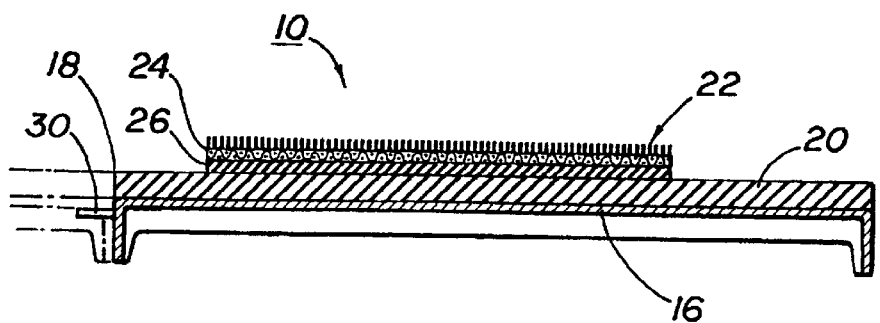
FIG. 2 is an elevation view of a raised flooring panel and covering taken along line 2—2 in FIG. 1.

Referring to FIG. 2, each panel 16 is covered with a pad 20. The padded panels 16 are covered with reinforced face cloth modules 22. Pad 20 may be made of any durable, resilient material. Suitable materials include solid, flexible polyvinyl chloride (PVC); foamed PVC; solid or foamed polyurethane, solid or foamed modified bitumen products such as urethane modified bitumen; or any other materials which provide the desired characteristics. If PVC products are used, they may be made from recycled materials. In particular, urethane modified bitumen, such as that disclosed in U.S. Pat. No. 5,096,764, entitled "Printable Carpet Tile and Method," the entirety of which is incorporated herein by this reference, may be used to produce suitable pads 20.

The appropriate thickness and other properties of pad 20 should be determined by reference to the anticipated environment. For instance, pad 20 may be made thicker to create additional shock absorption or thinner where minimized weight is important. Pad 20 may be cast directly onto panel 16 using known manufacturing methods. Pad 20 also may be cast or otherwise formed separately and bonded to panel 16 using any suitable adhesive. In either case, additional pads 20 may be manufactured separately for use as replacement pads.

Pads 20 cover the entire upper surface of panel 16. Thus, when panels 16 are installed as shown in FIG. 1, a continuous, gap free surface is formed. Panels 16 are not visible under pads 20. As shown in FIG. 2, panels 16 may have tabs, flanges or other interlocking means 30 for joining each panel to an adjacent panel. The top surfaces of joining means 30 need not be covered by pads 20 as they will be concealed under the edge of the adjoining panel 16 (and that panel's corresponding pad 20).

Reinforced face cloth modules 22 are made of a topcloth layer 24 and a stabilizing layer 26. Topcloth layer 24 may be any desirable surface, such as a woven, tufted, fusion bonded, needle punched or any other suitable textile layer or, alternatively, linoleum, vinyl or any other form of sheet or tile or other suitable floor treatment product.

Stabilizing layer 26 may be made of non-woven fiberglass or other suitable materials in the minimum amount necessary to provide the desired dimensional stability. Stabilizing layer 26 is dimensionally stable and thereby serves to stabilize reinforced face cloth module 22 so that it lies flat, i.e., it prevents module 22 from curling up at the edges or assuming a dome-like shape. Stabilizing layer 26 is not a polymeric layer alone. The stabilizing layer 26 is a layer that stiffens and substantially reinforces polymer materials and cannot be an amorphous polymer. Typically the stabilizing layer 26 is fiberglass and could be other polymer fibers but cannot be amorphous polymers that tend to stretch, grow, and dome. Layers 24 and 26 may be bonded together with adhesives or other suitable means. For example, layer 26 may be made up of a sheet of non-woven fiberglass encased in an adhesive or plastic, such as the urethane modified bitumen material described above. Layer 26 may be pressed against layer 24 before the adhesive or plastic material cures, thereby bonding the layers together. Using urethane modified bitumen encapsulation as an adhesive reduces the amount of material required to assemble a complete module and simplifies the manufacturing process.

Reinforced face cloth modules 22 may be made to fit panels 16 exactly or may be made in sizes that differ from the panel dimensions. In either case, as shown in FIG. 1, reinforced face cloth modules 22 are placed on the floor formed by pads 20 in such a manner as to completely cover pads 20. If reinforced face cloth modules 22 are the same size as pads 20, they may be (but need not necessarily be) placed so that the interfaces between adjacent reinforced face cloth modules 22 coincide with the interfaces between adjacent pads 20. Alternatively, or if reinforced face cloth modules 22 do not match the size of pads 20, reinforced face cloth modules 22 may be positioned without regard to the interfaces between adjacent pads 20.

If face cloth modules 22 are sufficiently stable, they may be positioned without any means for bonding them to pad 20. Alternatively, pressure sensitive or other adhesives or other means can be utilized to secure module 22 in place atop pads 20. Suitable adhesives include, but are not limited to acrylic-based pressure sensitive adhesives.

Although the foregoing is provided for purposes of illustrating, explaining and describing certain embodiments of the floor covering the present invention in particular detail, modifications and adaptations to the described floor covering and other embodiments will be apparent to those skilled in the art and may be made without departing from the scope or spirt of the invention as described in the following claims.

Figure 3:
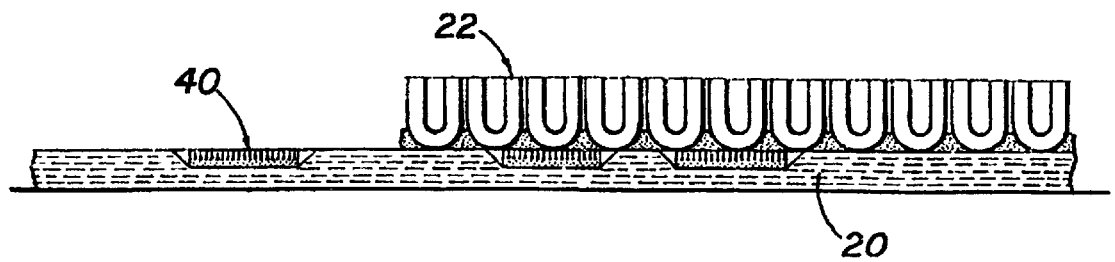
FIG. 3 is a side elevation view of a hook and loop fastener interposed between a reinforced face cloth module and a pad.

For instance, FIG. 3 shows an additional means for affixing reinforced face cloth modules 22 to pads 20. FIG. 3 shows an alternative embodiment for affixing the reinforced face cloth modules 22 to pads 20. Hook and loop fasteners 40 attach the reinforce face cloth modules 22 to the pads 20. Hook and loop fasteners 40 serve to accurately hold a floor covering 22 in place on the panels 16 while the modules 10 are removed to another location.

Figure 4:
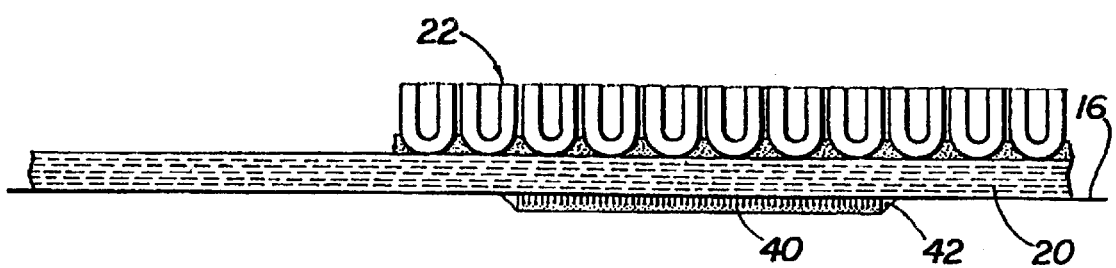
FIG. 4 shows a side elevation view of a raised flooring panel having a recess adapted to receive a hook and loop fastener.

In another alternative embodiment shown in FIG. 4, hook and loop fasteners 40 position in a recess 42 of the panel surface 16. Hook and loop fasteners 40 recessed in the pads 20 eliminate even minute deflections in the upper surface of the reinforced face cloth modules 22. The recess 42 can be about half the thickness of the hook and loop fastener 40 or the recess 42 can equal the thickness of the hook and loop fastener 40.

Figure 5:
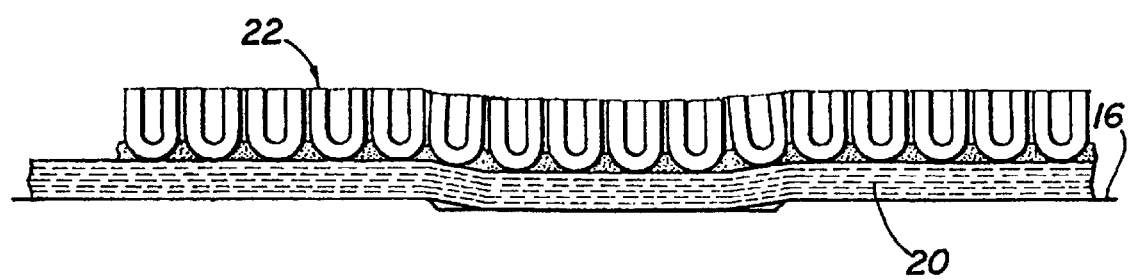
FIG. 5 shows a side elevation view of a raised flooring panel having a recess without utilizing a hook and loop fastener.

In yet another alternative embodiment shown in FIG. 5, the recess 42 can be utilized without the hook and loop fastener 40. Many recess configurations are possible ranging from a single hook and loop fastener 40 system to one with many hook and loop fasteners 40 configured in a variety of groupings. For instance, a corner recess system in which any combination of locators can be used. Alternatively, a perimeter arrangement recess system can serve to locate and hold reinforced face cloth modules 22 in place.

What is claimed is:

1. A raised flooring structure comprising:
 a) a panel having a substantially rigid substructure and a resilient pad bonded to the panel;
 b) a topcloth layer detachably affixed to the resilient pad;
 c) a stabilizing layer bonded to the top cloth layer; and
 d) a hook and loop fastener interposed between the resilient pad and the topcloth layer for detachably affixing the topcloth layer to the resilient pad, whereby the top cloth layer can be detached from the resilient pad without destroying the resilient pad.

* * * * *